United States Patent [19]
Lysik et al.

[11] Patent Number: 5,754,785
[45] Date of Patent: May 19, 1998

[54] COMMUNICATIONS NETWORK EQUIPMENT

[75] Inventors: John L. Lysik, Burlington; L. David Danenberg, Woodbury; James C. Chagnon, Southington, all of Conn.

[73] Assignee: General DataComm, Middlebury, Conn.

[21] Appl. No.: 430,210

[22] Filed: Apr. 27, 1995

[51] Int. Cl.$^6$ .................................................. G06F 15/16
[52] U.S. Cl. ................................ 395/200.52; 395/712
[58] Field of Search ........................ 395/700, 500, 395/712, 200.49, 200.52; 264/DIG. 1, DIG. 2

[56] References Cited

U.S. PATENT DOCUMENTS

| | | | |
|---|---|---|---|
| 4,999,806 | 3/1991 | Chernow et al. | 364/900 |
| 5,155,837 | 10/1992 | Liu et al. | 395/500 |
| 5,274,767 | 12/1993 | Maskovyak | 395/275 |
| 5,379,429 | 1/1995 | Hiragawa et al. | 395/700 |
| 5,421,017 | 5/1995 | Scholz et al. | 395/700 |
| 5,490,134 | 2/1996 | Fernandes et al. | 370/79 |

*Primary Examiner*—Alvin F. Oberley
*Assistant Examiner*—Kakali Chaki
*Attorney, Agent, or Firm*—David P. Gordon

[57] ABSTRACT

In accord with the objects of the invention, methods and apparatus for controlling communications network equipment are provided. The apparatus is used in a telecommunications network having a plurality of coupled nodes and a network controller coupled to at least one of those nodes, and generally comprises a node apparatus having a backplane and a plurality of functional cards coupled to the backplane. Each of the functional cards has a processor and memory for storing software which is used by the processor. One of the functional cards has memory for storing a current running version of software for each of the other of the plurality of functional cards, and a receiver and memory for storing in background incoming updated versions of software for the plurality of functional cards. The updated versions of software are provided in the overhead portion of the telecommunications signal frame, thereby being non-disruptive to the system. Upon command of the network controller, the updated versions of software are provided in foreground by the functional card having the receiver to the respective software memories of the other cards, thereby causing the other cards to run the updated versions of the software. The updating occurs simultaneously in all nodes.

1 Claim, 2 Drawing Sheets

COMMUNICATIONS NETWORK EQUIPMENT

BACKGROUND OF THE INVENTION

1. Field of Invention

The present invention relates generally to telecommunications. More particularly, the present invention relates to communications network equipment, including hardware and software for implementing non-disruptive software upgrades, for implementing software version fallback, and for implementing distributed software upgrades of communicating network equipment with central control.

2. State of the Art

Current methods of upgrading software in communications networks involves the disruption of customer data for relatively long periods of time (e.g., up to ten hours, depending upon network topology and stability), as the network equipment is shut down for customer data and is configured to receive software from a remote controller over the network. During the software upgrade, if there is a sudden network disturbance, it is possible that certain portions of the network may be isolated. In these situations, if the download sequence is continued, different network regions may end up running potentially incompatible software versions, resulting in the partial inoperability of the network. Even if there is no network disturbance, once a software upgrade of a communications network equipment is complete, the only mechanism for reverting to a previous version of the software is to perform a similar disruptive "upgrade" with the previous version. Thus, the current methods of upgrading software in communications networks can be seen to have serious drawbacks.

SUMMARY OF THE INVENTION

It is therefore an object of the invention to provide a system which conducts a substantially non-disruptive upgrade of communications network equipment.

It is another object of the invention to provide communications network equipment which easily returns its functioning to a previous software version.

It is a further object of the invention to provide a distributed software file transfer capability with the capability of central control in order to provide a flexible upgrade system for communications network equipment which can recover from network disturbances during upgrades.

In accord with the objects of the invention, methods and apparatus for controlling communications network equipment are provided. The apparatus is used in a telecommunications network having a plurality of coupled nodes and a network controller coupled to at least one of those nodes, and generally comprises a node apparatus having a backplane and a plurality of functional cards coupled to the backplane. Each of the functional cards has a processor means and software storage means for storing software which is used by the processor means. One of the functional cards has means for storing a current running version of software for each of the other of the plurality of functional cards, and means for receiving and storing in background incoming updated versions of software for the plurality of functional cards. The updated versions of software are provided in the overhead portion of the telecommunications signal frame, thereby being non-disruptive to the system. Upon command of the network controller, the updated versions of software are provided in foreground by the functional card having the means for receiving and storing the software of the other cards to the respective software storage means of the other cards, thereby causing the other cards to run said updated versions of software. The updating occurs simultaneously in all nodes.

Additional objects and advantages of the invention will become apparent to those skilled in the art upon reference to the detailed description taken in conjunction with the provided figures.

DETAILED DESCRIPTION OF THE PREFERRED EMBODIMENT

Figure 1:
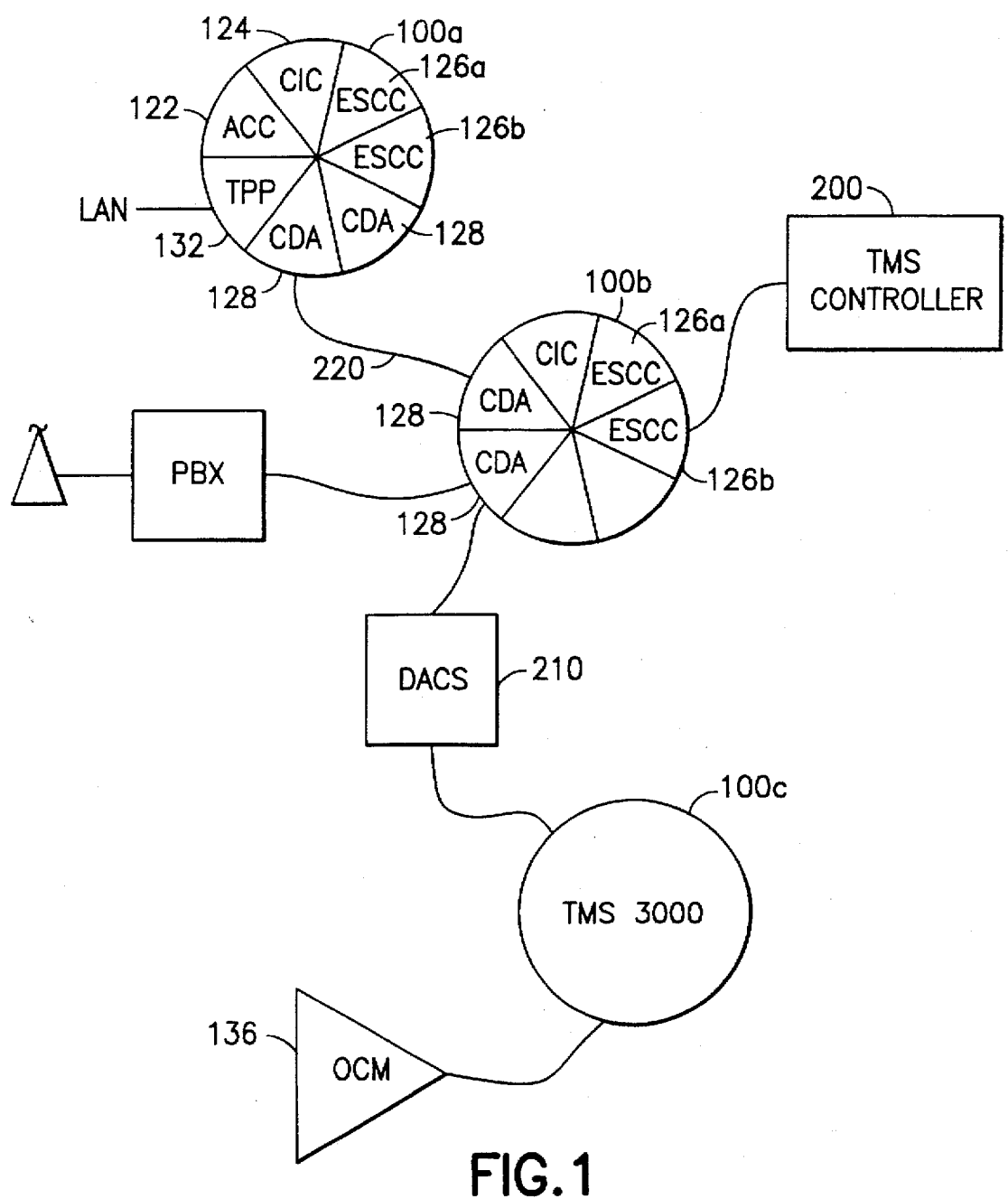
FIG. 1 is a schematic diagram of a telecommunications network having a plurality of nodes and a controller which incorporate the invention therein.

As set forth above, the invention relates to communications network equipment. As indicated in the schematic diagram of FIG. 1, a communications network 10 may include several nodes 100a, 100b, 100c, which are under control of a controller 200 (which is typically a personal computer) and which are coupled together via a DACS 210 or via direct lines 220. The nodes as shown in FIG. 1 are "TMS 3000" nodes (TMS being a trademark of General DataComm, Inc., Middlebury, Conn.) which are available from General DataComm, Inc., the assignee hereof. The TMS 3000 nodes are typically arranged with a backplane structure with an aggregate control card (ACC) 122, a channel interface control card (CIC) 124 for voice, data, etc., an enhanced controller card (ESCC) 126a, preferably a redundant ESCC 126b, and a CDA (combined DACS aggregate) card 128, all of which are available from General DataComm, Inc. The ESCCs 126a, 126b, as discussed in detail below, hold a copy of all of the software for all of the other cards of the TMS 3000 node. The CDA card 128 provides E1 or T1 and PBX interfaces, runs frames, and multiplexes and demultiplexes data. The TMS 3000 node may also include other cards such as a TMS packet processing card (TPP) 132 which can interface with a LAN or other packet or packet-based (e.g., ATM) equipment as seen with reference to node 100a. Also, as shown with reference to node 100c, the TMS 3000 node can interface with equipment such as an office communication manager (OCM) 136 which might include its own set of interface cards such as a line interface module (not shown), and channel cards (not shown).

Figure 2:
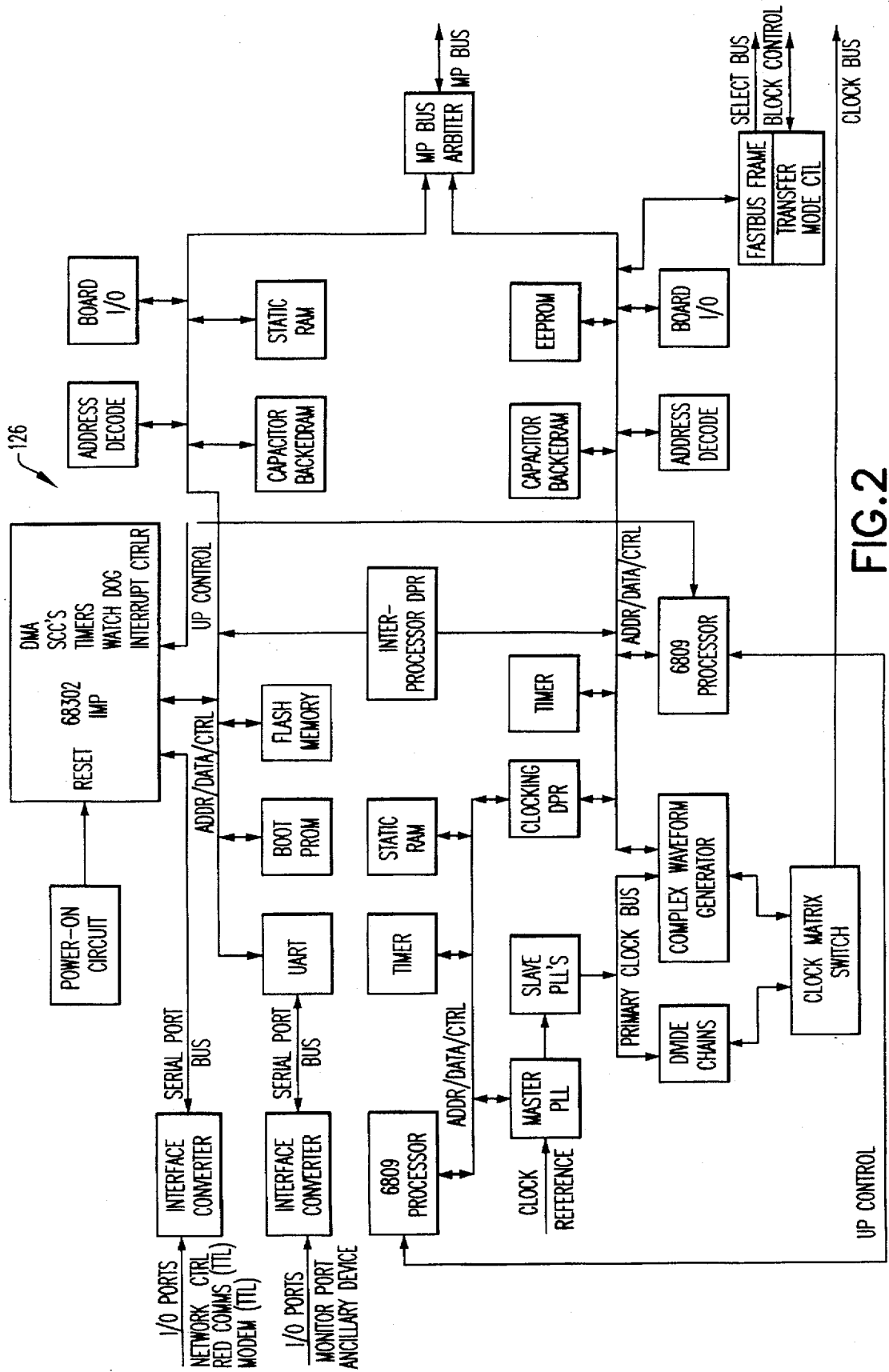
FIG. 2 is a block diagram of the enhanced system controller card which is found at the nodes of FIG. 1.

In accord with the invention, all new software versions for the communications system are generated by one or more system controllers 200. When it is desired to upgrade the entire system with the new software, the controller(s) provides a list to each node as to what software the node should have in its background area. In response, in the background, the nodes request from the controller or from other nodes the necessary software to fulfill that list. This software is then sent to the requesting node (from controller to node, and from node to node) in an overhead portion (e.g., COMMS) of the data communications frame. In other words, rather than shutting down the system and sending the software upgrade over the telecommunications lines in lieu of data at the data rates, the software is sent over an extended period of time in overhead while the nodes are passing data as usual. In order to accommodate the receipt of new software, the ESCC card is provided with extra memory storage (preferably sufficient flash memory as shown in FIG. 2) such that the ESCC card stores the current running software of the CIC, ACC, and CDA cards, and the incoming version upgrade of the software for those cards. Alternatively, to reduce storage requirements, the current versions of one or more of the cards can be over-written by the incoming version upgrade. However, in that situation, it is desirable to ensure that the current running software is not likely to be corrupted or lost by the CIC, ACC, and CDA cards, and back-up powering means (e.g., batteries) should be provided in order to power those cards. As another alternative, and as discussed below, a redundant ESCC card can be provided to store the "current" running version (and/or a previous version) of the software. Regardless of the configuration, when the transmission of the new software version is completed to all nodes requiring the new version, the upgrade can be activated by broadcasting a software change command from the controller(s) 200. While this activation requires that the ESCC card storing the new software version provide necessary software and software changes to the other cards in the TMS 3000 node, and therefore requires the shutting down of the node during this reprogramming, the disruption time is typically limited to five minutes or less, as the software upgrade is already distributed, and the data transfer rates at the node itself are much greater than the data transfer rates from the controller 200 to the node 100. In other words, the backplane data rates are typically greater than the telecommunications network data rates, and the reprogramming is done in parallel by the nodes, rather than in series.

As mentioned above, it is desirable not only to provide a system which conducts a substantially non-disruptive software upgrade, but also provides a signficantly simplified software version fallback. In particular, with the systems of the prior art, once a software upgrade of communications network equipment is complete, the only manner of falling back to a previous version is to shut the entire system done for another long period of time to perform a similar upgrade using the previous version. The need to go back to a previous version can be driven by issues running the new software with the network configuration, or user dissatisfaction with the performance of the new software version.

According to the present invention, the version fallback feature is accomplished by providing memory at the TMS 3000 node to store the previous version of the software. In one embodiment of the invention, the extra memory is provided on the ESCC card which also stores the current software version and the incoming upgrade. Thus, upon being signalled to upgrade the software, the new software would be written to the other cards of the TMS 3000 node, the new software would be designated as "current software", and the "current software" would be designated as "previous version software". The previous "previous version" software could then be overwritten to receive the next upcoming software revision. Of course, the files could be handled in various manners, including transfering of files to certain addresses, or by changing pointers to where the current, previous version, and new version software are located. However, regardless of how handled, if it is desired to quickly fall back to the previous version of software, the previous version is on-site at the node, and the fallback can be easily and quickly accomplished by command of the controller 200.

In a second embodiment of the invention, and as currently implemented, instead of providing large amounts of memory on a single ESCC, a redundant ESCC 126b is preferably provided, and each ESCC has enough storage to store current versions of software for the cards of the TMS 3000 node except the CDA card, as well as enough storage to receive new software for all cards including the CDA card. Effectively, then, as new software is received at the active ESCC, the new software and current running versions are stored for all cards in the active ESCC, and the new software for the CDA overwrites (in the active ESCC only) the current CDA software in the active ESCC. The CDA is provided with a power back-up so that it will not lose memory in case of a power outage. When the new software version is activated system-wide, the new software is transferred to the appropriate cards, and the new software becomes the current version, while the "current version" becomes the previous version. However, because the previously "current version" of the CDA software was being overwritten in the ESCC card, there is no previous version for the CDA software available on the active ESCC. The redundant ESCC card, however, is maintained in its previous state until the user causes the controller 200 to cause the nodes to upgrade the redundant ESCC to the current version. Thus, until that time, should a previous version fallback be desired, the previous version software is available from the redundant ESCC. After the user has caused the redundant ESCC to receive the current software version, if a new software version for the CDA has started to be written to the active ESCC, the easy fallback is not available. It should be appreciated that in this embodiment, the primary function of the redundant ESCC card is to provide desirable redundancy; and the easy version fallback is an added desirable feature.

In accord with another aspect of the invention, by combining the basic capability of the distributed software file transfer set forth above with capabilities for central control by the network operator, a more flexible upgrade system is generated. In particular, it may be desirable to initiate and monitor the various steps of the background download according to the sequence:

1) transfering a list of software files required by the nodes onto the TMS controller 200;
2) specifically selecting those files desired for background downloading, thereby initiating the background download of those selected files;
3) observing the stability and integrity of the network throughout the download; and
4) upon determining that all nodes have the required software files, activating the upgrade by sending a global message to the nodes to install the background files in the foreground.

There have been described and illustrated herein communications network equipment apparatus and methods relating thereto. While particular embodiments of the invention have been described, it is not intended that the invention be limited thereto, as it is intended that the invention be as broad in scope as the art will allow and that the specification be read likewise. Thus, while the TMS 3000 was described as preferably having redundant ESCC cards, it will be appreciated by those skilled in the art, that the software version fallback, and the substantially non-disruptive software upgrade can be accomplished with a single ESCC card as described. Also, while a specific embodiment of the ESCC card is shown with reference to FIG. 2, it will be appreciated that other circuitry could be utilized to implement the invention. It will therefore be appreciated by those skilled in the art that yet other modifications could be made to the provided invention without deviating from its spirit and scope as so claimed.

We claim:

1. A method of updating software in a plurality of nodes in a telecommunications network, the telecommunications network having a network controller, and node apparatus at each of said plurality of nodes, said method comprising:

a) transfering a list of software files required by the nodes onto the network controller;

b) specifically selecting at the network controller those files desired for background downloading, thereby initiating the background download of those selected files to the nodes;

c) observing the stability and integrity of the telecommunications network during the background download; and d) upon determining that all nodes have received the required software files, activating the update by sending a global message to the nodes from the network controller to simultaneously install the background files in the foreground of the nodes.

* * * * *